(No Model.)
J. D. RIGGS.
WOVEN WIRE FARM FENCE.
No. 460,218. Patented Sept. 29, 1891.
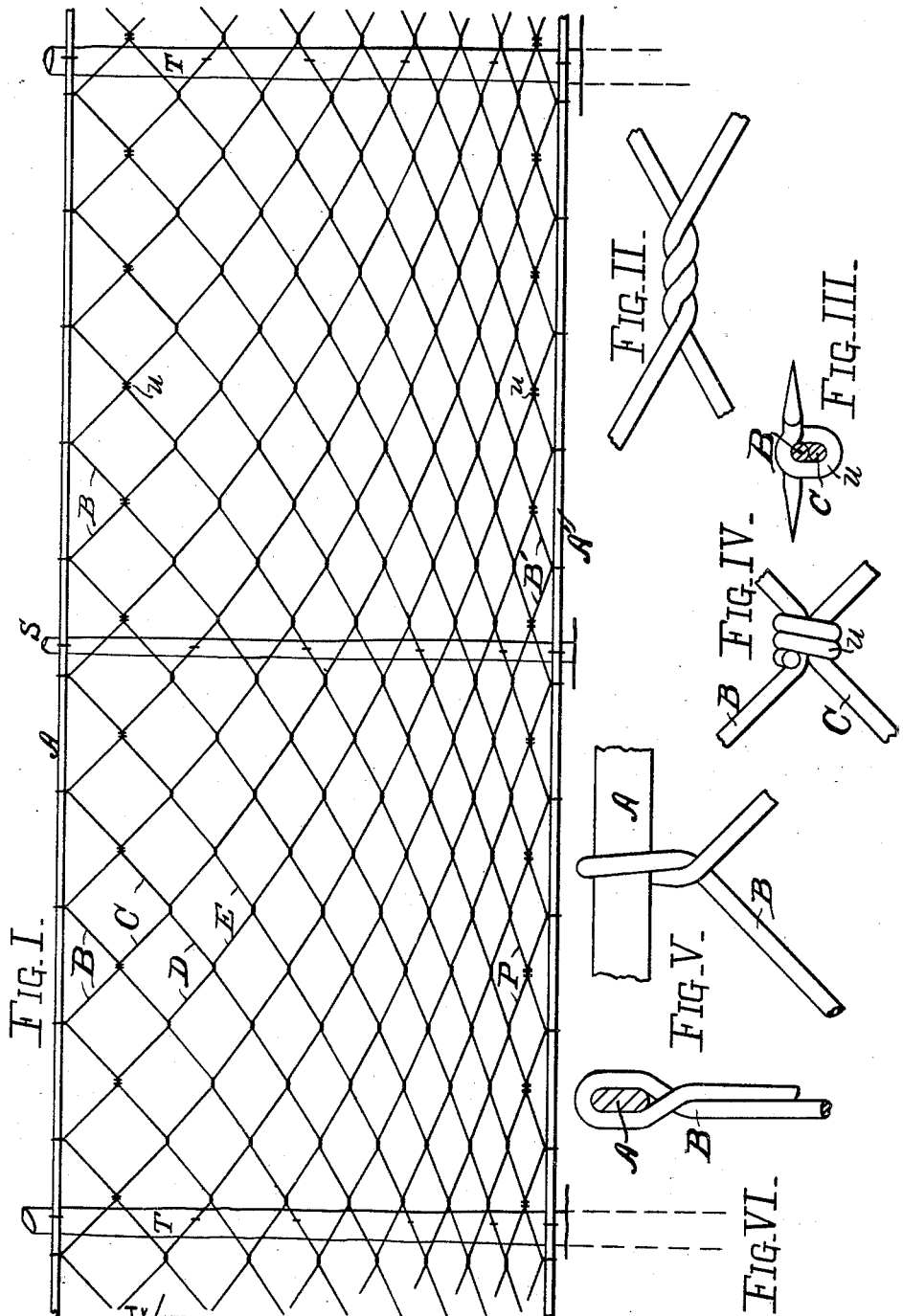
WITNESSES.
INVENTOR
John D. Riggs.

UNITED STATES PATENT OFFICE.

JOHN D. RIGGS, OF DETROIT, MICHIGAN.

WOVEN-WIRE FARM-FENCE.

SPECIFICATION forming part of Letters Patent No. 460,218, dated September 29, 1891.

Application filed September 29, 1890. Serial No. 366,551. (No model.)

*To all whom it may concern:*

Be it known that I, JOHN D. RIGGS, a citizen of the United States, residing at Detroit, in the State of Michigan, have invented certain new and useful Improvements in Woven-Wire Farm-Fences, of which the following, in connection with the accompanying drawings, is a specification.

The object of my invention is to provide a wire fence that will effectually bar all of the domestic animals and one that will not lacerate them if they should accidentally run against it.

A further object of my invention is to provide a woven-wire fence with small meshes near the bottom, where the smaller animals come against it, and larger meshes where only the larger animals come against it, thereby constructing a woven-wire fence with a minimum of wire.

In the accompanying drawings similar letters of reference refer to like parts in the several views.

In the drawings, Figure I is a side elevation of a fence embodying my invention. Fig. II is a detailed side elevation showing the manner of connecting the wires in the central portion of the fence. Figs. V and VI are respectively a detailed side and end elevation showing the manner of connecting the selvage-wires to the adjacent wires of the netting. Figs. III and IV are respectively detailed end and side elevations showing the manner of connecting the edge fabric-wires to the ones next inside of them.

In the drawings, A and A' are large flattened wires forming the top and bottom selvage of the fence and are stretched very taut on the posts, so that the tension of the fabric of the fence will not deflect them perceptibly. All wires except A and A' are round and about such as are used in the cables of barbed wire for fences. The wires B and B' are looped about the wires A and A', respectively, as shown in Figs. V and VI, and are connected with the fabric-wires C and P, respectively, by having a barb $u$ wrapped around the two, as shown in Figs. III and IV. The fabric-wires C D E, &c., to P are each connected to adjacent wires by twisting, as shown in Figs. I and II.

I prefer to connect B and B' to the fabric-wires by means of pointed barbs, as shown in Figs. III and IV, in most cases, although I sometimes cut off some or all of the points.

It will be seen from Fig. I that the meshes near the top of the fence are much larger than those near the bottom, and that this is accomplished by increasing the vertical width of the meshes from bottom to top, the horizontal length of the mesh remaining the same throughout.

T are ordinary fence-posts, such as are used for board or barbed-wire fences, about five inches in diameter, and set into the ground about two feet, and preferably about twelve or fifteen feet apart. S are wooden pieces which I denominate "stays." They rest on the surface of the ground and may be about half as large in diameter as the posts T.

By forming the fabric with a continuous series of wires from top to bottom and end to end and weaving said wires into meshes of gradually-increasing size vertically from bottom to top of the fabric and of uniform length horizontally the tensile resistance of the fabric is practically uniform throughout, and a fence can readily be constructed therewith in an economical manner and of great strength throughout its area without abrupt breaks in the continuity and size of the mesh and consequent marked variability in its strain-resisting quality.

What I claim as new, and desire to secure by Letters Patent, is—

1. A woven-wire fence consisting of anchoring-posts and stay-pieces, horizontal top and bottom selvage-wires connected thereto, independent wires looped about said selvage-wires, and a series of fabric-wires connected at the top and bottom of the series to said independent wires and to said posts and stays and woven together into an unbroken series of meshes from top to bottom and side to side of the fence, all of decreasing size vertically from top to bottom of the series, substantially as set forth.

2. A wire fabric for fences, consisting of straight selvage-wires, a wire looped over said selvage-wires, and a series of wires connected with the looped wires and woven together, so as to form substantially diamond-shaped meshes of uniform length horizontally and of gradually-decreasing width vertically from top to bottom, substantially as set forth.

3. A fabric for woven-wire fences, consisting of a series of wires interwoven and twisted together at their juncture into a series of substantially diamond-shaped meshes of gradually-decreasing size vertically from the top to the bottom of the fabric and having the selvage-wires connected to the adjacent wires by an independent wire and barbs or short lengths of wire, substantially as set forth.

In testimony whereof I have hereunto set my hand in the presence of two subscribing witnesses.

JOHN D. RIGGS.

Witnesses:
WILLIAM E. HENZE,
EDMUND JONCAS.